United States Patent
Karacali-Akyamac et al.

(10) Patent No.: US 10,904,095 B2
(45) Date of Patent: Jan. 26, 2021

(54) NETWORK PERFORMANCE ASSESSMENT WITHOUT TOPOLOGICAL INFORMATION

(71) Applicant: International Business Machines Corporation, Armonk, NY (US)

(72) Inventors: Bengi Karacali-Akyamac, Somerset, NJ (US); John Michael Tracey, Scarsdale, NY (US); Claude Basso, Nice (FR); Paul Crumley, Yorktown Heights, NY (US); Wesley Michael Felter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 16/032,133

(22) Filed: Jul. 11, 2018

(65) Prior Publication Data
US 2020/0021493 A1 Jan. 16, 2020

(51) Int. Cl.
H04L 12/24 (2006.01)
H04L 12/26 (2006.01)
H04L 12/751 (2013.01)

(52) U.S. Cl.
CPC .......... H04L 41/12 (2013.01); H04L 43/087 (2013.01); H04L 43/0829 (2013.01); H04L 43/0888 (2013.01); H04L 43/10 (2013.01); H04L 45/02 (2013.01)

(58) Field of Classification Search
CPC ....... H04L 41/12; H04L 43/10; H04L 43/087; H04L 43/0829; H04L 43/0888; H04L 45/02
See application file for complete search history.

(56) References Cited

U.S. PATENT DOCUMENTS

| 7,782,796 B2 * | 8/2010 | Haley | H04L 41/12 370/254 |
|---|---|---|---|
| 8,023,421 B2 | 9/2011 | Lloyd et al. | |
| 8,990,948 B2 | 3/2015 | Kumar et al. | |
| 9,172,632 B2 | 10/2015 | Kazerani et al. | |
| 9,699,109 B1 | 7/2017 | Sait | |

(Continued)

FOREIGN PATENT DOCUMENTS

| CN | 106685757 A | 5/2017 |
|---|---|---|
| EP | 1770929 A1 | 4/2007 |

OTHER PUBLICATIONS

Abdu et al., "Measuring and Understanding Throughput of Network Topologies", IEEE, 2016 (pp. 15). https://people.inf.ethz.ch/asingla/papers/sc16.pdf.

(Continued)

*Primary Examiner* — Hassan Kizou
*Assistant Examiner* — Abdullahi Ahmed
(74) *Attorney, Agent, or Firm* — Patterson + Sheridan, LLP (57) ABSTRACT

Techniques for network performance assessment are described. Techniques may include collecting initial measurements relating to transmission of probe traffic between endpoints of endpoint pairs in a plurality of endpoint pairs and clustering the plurality of endpoints into a plurality of endpoint groups. The method may also include determining a plurality of endpoint group pairs and generating a network performance assessment, based on measuring performance metrics pertaining to traffic between endpoints within the endpoint groups in the plurality of endpoint group pairs.

20 Claims, 8 Drawing Sheets

(56) References Cited

U.S. PATENT DOCUMENTS

| | | | |
|---|---|---|---|
| 2006/0047809 A1 | 3/2006 | Slattery et al. | |
| 2007/0004399 A1 | 1/2007 | Laiho et al. | |
| 2008/0080376 A1 | 4/2008 | Adhikari et al. | |
| 2009/0122697 A1* | 5/2009 | Madhyasha | H04L 41/12 370/229 |
| 2015/0381486 A1* | 12/2015 | Xiao | H04L 45/70 370/237 |
| 2016/0359680 A1* | 12/2016 | Parandehgheibi | G06F 3/0482 |
| 2017/0324488 A1 | 11/2017 | Yi et al. | |
| 2018/0152369 A1* | 5/2018 | McCallen | H04L 43/106 |

OTHER PUBLICATIONS

RFC 2544: Benchmarking Methodology for Network Interconnect Devices, S. Bradner, J. McQuaid, Mar. 1999.
RFC 2889: Benchmarking Methodology for LAN Switching Devices, R. Mandeville, J. Perser, Aug. 2000.
International Search Report for Application No. PCT/IB2019/055912 dated Sep. 30, 2019.

* cited by examiner

FIG. 1

Endpoint Correlation Table ~200

|   | A 110 | B 111 | C 112 | D 113 | E 114 | F 115 | G 116 | H 117 |
|---|---|---|---|---|---|---|---|---|
| A 110 | - | T1 | T2 | T2 | T3 | T3 | T3 | T3 |
| B 111 | T1 | - | T2 | T2 | T3 | T3 | T3 | T3 |
| C 112 | T2 | T2 | - | T1 | T3 | T3 | T3 | T3 |
| D 113 | T2 | T2 | T1 | - | T3 | T3 | T3 | T3 |
| E 114 | T3 | T3 | T3 | T3 | - | T1 | T2 | T2 |
| F 115 | T3 | T3 | T3 | T3 | T1 | - | T2 | T2 |
| G 116 | T3 | T3 | T3 | T3 | T2 | T2 | - | T1 |
| H 117 | T3 | T3 | T3 | T3 | T2 | T2 | T1 | - |

NETWORK PERFORMANCE ASSESSMENT WITHOUT TOPOLOGICAL INFORMATION

BACKGROUND

The present invention relates to determining network properties, and more specifically, to determining network performance in a network with unknown properties, such as an unknown network topology.

In many networks, including cloud based networks for distributed applications, the network topology and other network performance properties are only known by the operator of the network. For proprietary protection and security concerns, the operator of the network may keep the topology of the network confidential. As a result, the network topology will be unknown or appear arbitrary to business units and/or customers that deploy applications or other services on the network. This may result in sub-optimized utilization of the network by the applications running on the network.

SUMMARY

According to one embodiment of the present invention, a method of network performance assessment is provided. The method including collecting initial measurements relating to transmission of probe traffic between endpoints of endpoint pairs in a plurality of endpoint pairs, wherein the endpoints in the plurality of endpoint pairs are selected from a plurality of endpoints in a network, clustering the plurality of endpoints into a plurality of endpoint groups, based on the collected initial measurements, determining a plurality of endpoint group pairs, based on the plurality of endpoint groups, and generating a network performance assessment, based on measuring performance metrics pertaining to traffic injected between endpoints across the endpoint groups in the plurality of endpoint group pairs. Source or sink of application or probe traffic is referred to as an endpoint.

According to another embodiment of the present invention, a system for providing network performance assessment is provided. The system may include one or more computer processors and a memory containing a program which when executed by the one or more computer processors performs an operation. The operation includes collecting initial measurements relating to the transmission of probe traffic between endpoints of endpoint pairs in a plurality of endpoint pairs, wherein the endpoints in the plurality of endpoint pairs are selected from a plurality of endpoints in a network, clustering the plurality of endpoints into a plurality of endpoint groups, based on the collected initial measurements, determining a plurality of endpoint group pairs, based on the plurality of endpoint groups, and generating a network performance assessment, based on measuring the performance of traffic injected between endpoints across the endpoint groups in the plurality of endpoint group pairs. Endpoint grouping information may be used to speed up data collection during the initial measurement collection as well as after the grouping of endpoints has converged. A plurality of endpoint groups is considered finalized after it does not change in consecutive measurement steps.

According to another embodiment of the present invention, a computer program product for network performance assessment is provided. The computer program product including a computer-readable storage medium having computer-readable program code embodied therewith, the computer-readable program code executable by one or more computer processors to perform an operation. The operation includes collecting initial measurements relating to transmission of probe traffic between endpoints of endpoint pairs in a plurality of endpoint pairs, wherein the endpoints in the plurality of endpoint pairs are selected from a plurality of endpoints in a network, clustering the plurality of endpoints into a plurality of endpoint groups, based on the collected initial measurements, determining a plurality of endpoint group pairs, based on the plurality of endpoint groups, and generating a network performance assessment, based on monitoring traffic flows between endpoints across the endpoint groups in the plurality of endpoint group pairs.

DETAILED DESCRIPTION

Embodiments described herein provide a manner in which a user of a network can determine properties of a network, where the network topology is not provided by the network provider. In order for users (e.g., business units, customers, etc.) utilizing the network to understand the performance of the services deployed on the network, the users may wish to also understand the performance and other properties of the network. When this information is not publicly available or provided by the network provider, the user may not fully understand or optimize the performance of the services and applications deployed on the network. For example, the Quality of Experience (QoE) of applications executing on networks such as a cloud network depends on the Quality of Service (QoS) provided by the underlying network.

Traditional network performance assessment becomes more time consuming as the scale of the network increases since the number of endpoints quadratically increases the number of network paths between the endpoints that need to be assessed. This assessment is made even more difficult when the topology of the network is unknown. A network topology can be used to group endpoints together into endpoint groups to reduce the number of measurements required to accurately assess the network. However, in some networks (e.g., in cloud infrastructures), network topology is not visible to users. The embodiments described herein provide a method and system to reduce the set of measurements that are needed to be collected from the network without knowing the network topology. These solutions described herein lower the time requirement and the number of measurements required to accurately estimate the network performance.

As described herein, the number of measurements needed is reduced by collecting a set of endpoints that are exhibiting similar network performance into groups and measuring the network performance between pairs of endpoint groups instead of between each pair of endpoints. The performance measurements as described herein are used both to create groups of endpoints that exhibit similar performance and to assess the performance of the network.

Embodiments described herein also provide techniques for quantitatively assessing the performance of a network before deploying applications onto the network and/or when choosing between alternative networking solutions for an application deployment, thereby allowing users to ensure proper QoS for deployed applications. Assessing whether a given network (e.g., within a cloud computing environment) is capable of supporting a given application is helpful in identifying and resolving networking problems that may adversely impact the QoE of any given application or service running on the network. For example, if application components (e.g., virtual machines (VMs)/containers) executing on the network have poor performance (e.g., poor connectivity), the methods and systems described herein may be used to determine methods for assessing the cause of the problems and improving the performance of the application. Additionally, methods and systems are described herein that orchestrate deployment of application elements (processes, containers, VMs, servers) in a network to support a given application.

Figure 1:
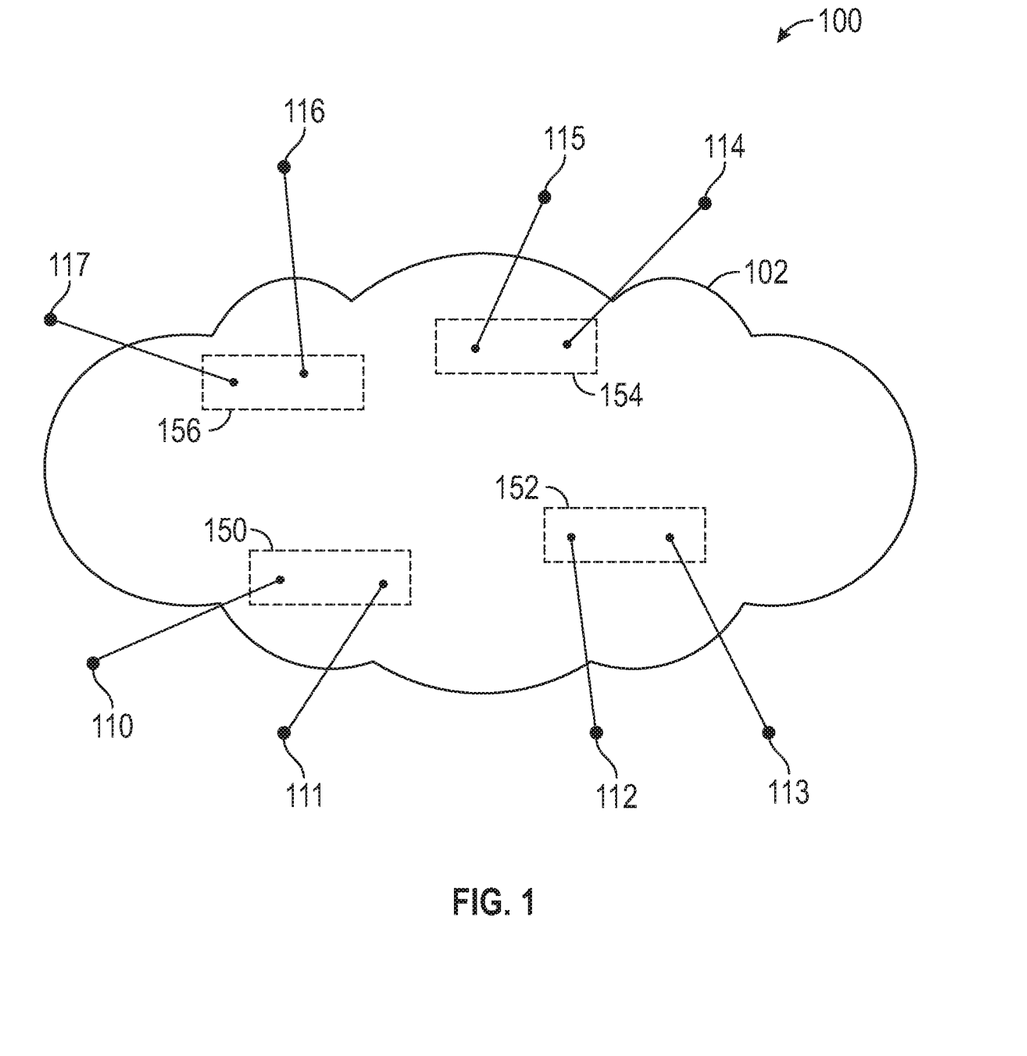
FIG. 1 illustrates a network, according to one embodiment.

Turning now to FIG. 1, which illustrates an example networking system 100, including network 102. In some examples, network performance can be measured by placing endpoints into the network 102. For example, as shown in FIG. 1 endpoints 110-117 may be placed in various points in the network 102. Endpoints may be inserted at points where application components would be placed. In some examples, probe traffic is injected between the endpoints and is directed to follow a traffic pattern relevant to the applications to be deployed over the network. A traffic pattern refers to the manner in which endpoint pairs exchange probes. Traffic pattern determines the set of source and destination endpoints and the time in which they inject probe traffic. This probe traffic is then measured for key network performance metrics such as throughput, packet delay, packet jitter, and packet loss, among other network performance metrics.

There are many example traffic patterns that may be utilized to collect network performance metrics and data. In some examples, a given traffic pattern determines which endpoint pair, such as the endpoint pairs between the endpoints 110-117, is exercised or measured at a given time. In some examples, multiple pairs are exercised concurrently. For example, during the collection of network performance metrics/data, concurrent end-to-end performance data can be collected such that every endpoint injects probe traffic destined to exactly one other endpoint, ensuring that in a network with an "n" number of endpoints, n flows are injected simultaneously and every endpoint sends and receives from one other endpoint. In some examples, a ring traffic pattern can be used, where endpoints are ordered in a ring and neighbors in the ring exchange probe traffic simultaneously. The ring traffic patterns may be utilized for network performance assessment of deep learning applications. Further, during the collection of the network performance metrics/data, random rings can be generated, effectively exercising different pairs or have steps that cover the whole network deterministically. In some examples, many-to-many traffic pattern may be used where each endpoint exchanges probe traffic with every other endpoint. Many-to-many traffic pattern may be utilized for network performance assessment of high performance computing applications.

As networks, such as network 102, grow, measurement based solutions suffer from scaling problems; the combination of endpoints to be tested can rise rapidly and significantly increase the cost in time and resources devoted to measuring network performance.

As described herein, method and systems for a network, such as network 102 and a set of endpoints, such as endpoints 110-117, are provided which determine a reduced set of endpoint pairs to be measured with probe traffic. Specifically, a method for performance assessment may include collecting initial measurements relating to transmission of probe traffic between endpoints, such as endpoints 110-117. As shown in FIG. 1, this assessment may rely on injecting probe traffic between endpoint pairs in a plurality of endpoint pairs following a traffic pattern such as a ring traffic pattern or a many-to-many pattern. In some examples, the traffic pattern may include each endpoint paired to every other endpoint. For example, endpoint 110 may be paired with endpoint 111 as a first pair, endpoint 112 as a second pair, and endpoints 113-117 as third to seventh pairs respectively. In the same way, endpoint 111 may be paired to endpoint 112 and endpoints 113-117 as ninth through fifteenth pairs. In one example, the plurality of endpoint pairs formed by the endpoints illustrated in FIG. 1 comprises 28 endpoint pairs between the endpoints. In some examples, the initial measurements may be stored in an endpoint correlation table as discussed in relation to FIG. 2.

Figure 2:
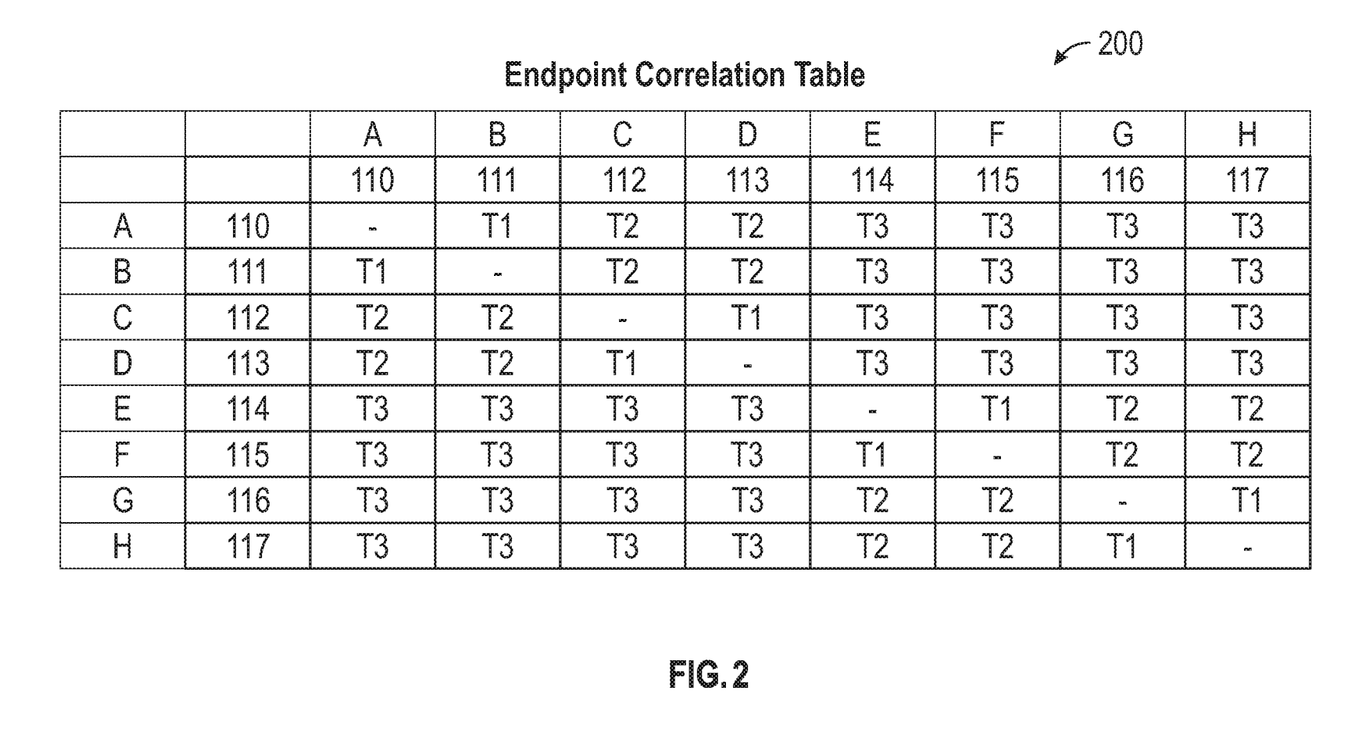
FIG. 2 depicts endpoint correlation table, according to one embodiment.

In some examples, an endpoint correlation matrix can be constructed gradually using multiple steps in a number of ways. One example way is to collect measurements between endpoint pairs following a ring traffic pattern at each step. In the ring-traffic pattern, endpoints are placed in a ring and every endpoint probes its neighbor on the right simultaneously. Hence, at each step with "n" endpoints, total of n pairs of endpoints are probed. The performance data collected at each step can be recorded for each pair in the correlation matrix. If multiple measurements pertaining to a given pair of endpoints are collected over multiple steps, a representative number such as the mean or the median of such measurements may be entered to the matrix as the data for the given endpoint pair. In another example, the endpoint correlation matrix is constructed by randomly selecting a small subset of endpoints and collect measurements following a many-to-many traffic pattern at each step. In the many-to-many traffic pattern, each endpoint probes every other endpoint in the network simultaneously. The size of the subset of endpoints utilized at each step can be pre-defined based on the scale of the network and this size could be the whole network. At each iteration, a randomly selected subset may be used to gather data between endpoints. Thus, at each step with n endpoints, total of $((n) \times (n-1))$ pairs of endpoints are probed. If multiple measurements pertaining to a given pair of endpoints are collected over multiple steps, a representative number such as the mean or the median of such measurements may be entered to the matrix as the data for the given endpoint pair. When there is an entry for each of the endpoint pairs in the correlation matrix, measurement collection may be stopped. Alternatively, measurement collection may continue for a pre-defined number of steps.

Additionally, in the performance data of two endpoints is an indicator that over all data collection steps, the performance of the two endpoints was similar. This similarity is typically due to topological proximity between the two endpoints. An example way to determine such similarity between two endpoints is to compare the rows (or the columns) of the two endpoints in the correlation matrix. Two rows of the correlation matrix can be compared in a number of ways. One example way is to first determine the matches between rows; i.e. if the ith column values in both of the rows are within a threshold the ith value is considered a match. Second, for all values of i, from the first to the last column, the number of matches may be counted. The data in the correlation matrix may be utilized to determine similarity between plurality of endpoints to determine subsets or clusters of endpoints with similar rows (or columns) in the matrix.

In some examples, a ring traffic pattern may be used to collect initial measurements. As iterative generations of the ring traffic pattern are performed, performance data between more of the endpoint pairs can be stored in the endpoint correlation table. When estimated endpoint groupings based on correlation does not change between iterations; (i.e., when the groups converge or when a predefined number of iterations has been reached), the initial collection of measurements may be stopped and the endpoint groups finalized. After a predefined number of "m" iterations, an understanding of how the performance under the ring traffic pattern as well as the groups of endpoints can be gathered from the collected data. In some examples, the iterations of ring traffic patterns may include measuring random rings as well as a number of iterations that measure carefully selected rings that utilize the endpoint grouping info (for example to determine how much throughput one could get from a topologically "best" or "worst" ring). Similarly, many-to-many traffic pattern can be utilized to group the endpoints over multiple iterations.

The method for performance assessment may also include, based on the collected initial measurements, clustering the plurality of endpoints (endpoints 110-117) into a plurality of endpoint groups. For example, endpoints with similar measurements may be placed in an endpoint group. For example, as shown in FIG. 1, endpoints 110 and 111 may be clustered together as endpoint group 150, endpoints 112 and 113 as endpoint group 152, endpoints 114 and 115 as endpoint group 154, and endpoints 117 and 118 as endpoint group 156.

Figure 3:
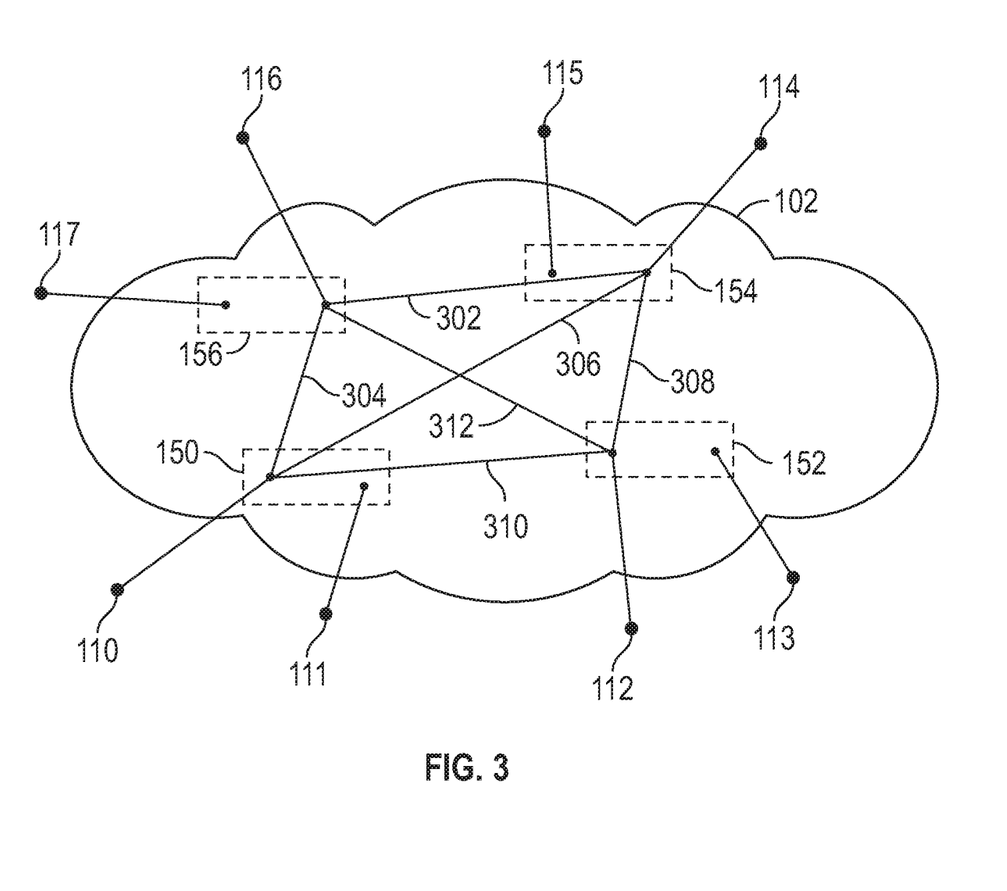
FIG. 3 illustrates a network with a plurality of endpoint groups, according to one embodiment.

The method for performance assessment may also include determining a plurality of endpoint group pairs, based on the plurality of endpoint groups, and generating a network performance assessment, based on performance metrics pertaining to the probe traffic injected between endpoints across the endpoint groups in the plurality of endpoint group pairs, as further described herein and in relation to FIG. 3.

FIG. 2 depicts an endpoint correlation table, according to one embodiment. The endpoint correlation table may comprise a matrix, a table, or any other organizational structure for storing collected data. As mentioned above in relation to FIG. 1, initial measurements may be collected for the endpoints. In some examples, probe traffic may be transmitted between the two endpoints of each endpoint pair and the measurement of the probe traffic may be stored in the endpoint correlation table 200. For example, the measurement of probe traffic from endpoint 110 to endpoint 111 may be stored in row A column B of table 200. Similarly the other direction from endpoint 111 to 110 may be stored in row B column A. For bi-directional metrics, values in row A column B and row B column A would be identical. Each collected measurement for the endpoint pairs may be stored in the table 200. In some examples, the measurement may comprise a throughput of the probe traffic where the throughput for each endpoint pair is stored in the endpoint correlation table 200. In other examples, the initial measurements may comprise measurements of one or more of a number of network performance parameters such as packet delay, jitter and packet loss measurements collected using traffic patterns such as ring or many-to-many. In some examples, as described herein, the endpoint correlation table may be used to cluster the plurality of endpoints into endpoint groups.

For example, as shown in FIG. 2, the rows in the correlation matrix corresponding to endpoints 110 and 111 have similar throughput values in matching columns (all columns excluding A and B) (as shown in rows A and B and columns A and B of the FIG. 2). Since these endpoints have similar throughput values in rows A and B at matching columns (except column A and column B), they can be assumed to be in a similar position in a network, such as in the same data center or on the same rack in a data center. Thus endpoint 110 and 111 can be clustered into endpoint group 150. Each of the remaining measurements shown in FIG. 2 can be used to cluster the remaining endpoints into endpoint groups. These endpoint groups may be both estimated based on preliminary measurements, updated as more initial measurements are collected, and/or finalized after enough data has been collected to finalize the groupings or after a specific number of initial measurement iterations is completed. In some examples, the initial measurements may be collected continuously to update the network performance assessment on an ongoing basis.

FIG. 3 illustrates a network with a plurality of endpoint groups, according to one embodiment. The endpoint groups 150-156 used to generate a network performance assessment. In some examples, a representative endpoint may be selected from each endpoint group. For example, endpoint 110 may be selected from endpoint group 150, endpoint 112 may be selected from endpoint group 152, endpoint 114 may be selected from endpoint group 154, and endpoint 116 may be selected from endpoint group 156. In some examples, probe traffic, such as probe traffic 302-312, may be transmitted between each selected representative endpoint. This allows for the network performance assessment to be generated without having to send probe traffic between each pair of endpoints 110-117. It is also possible to use all endpoints in a group by distributing the sources or sinks of probe traffic between the endpoints in a group.

Figure 4:
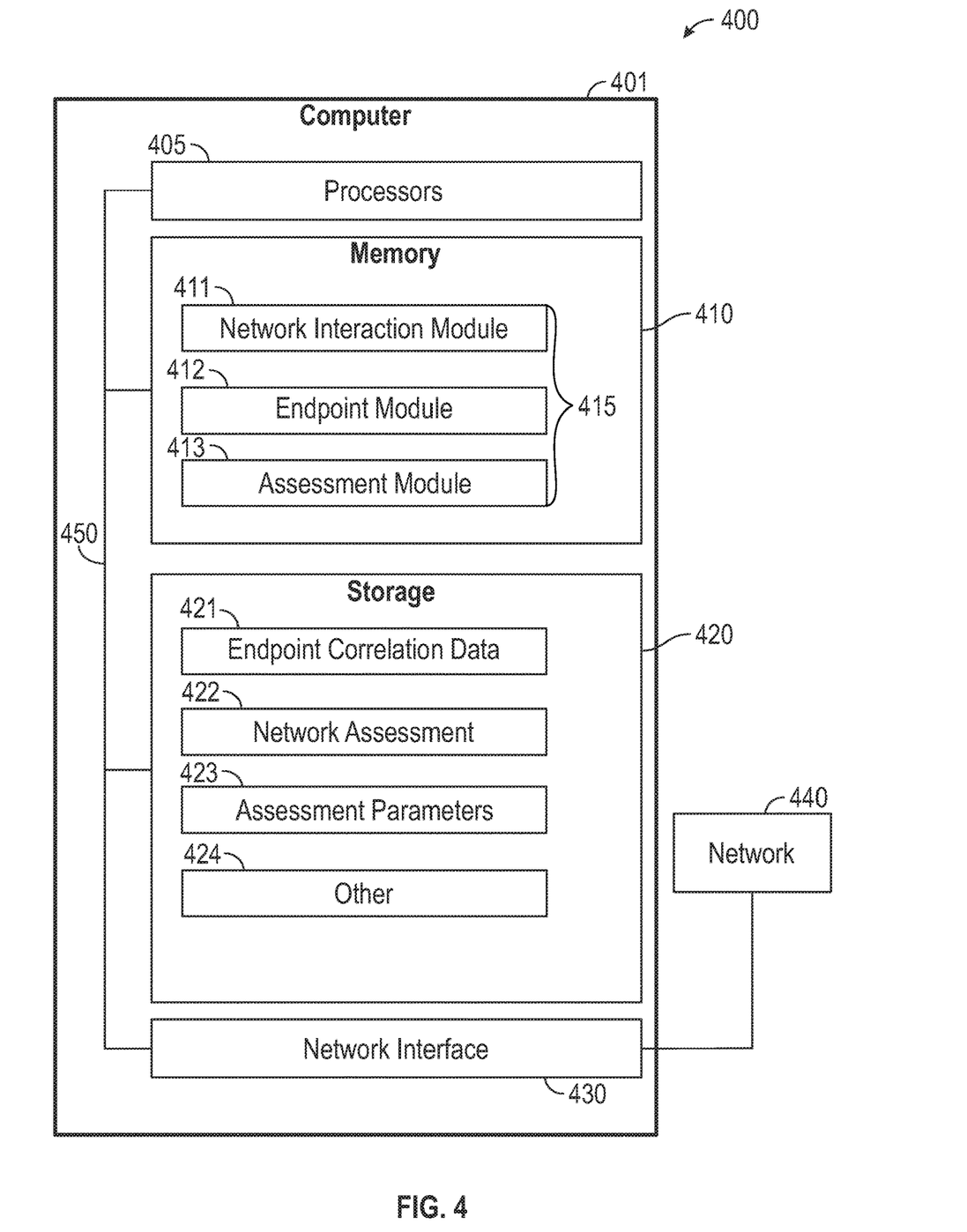
FIG. 4 illustrates a block diagram of a server to facilitate network performance assessment, according to one embodiment.

FIG. 4 illustrates a block diagram of a server to facilitate network performance assessment, according to one embodiment. As shown in, the arrangement 400 may include a server embodied as computer 401 configured to execute the function of the networking system 100 and perform the methods described herein. The computer 401 is shown in the form of a general-purpose computing device. The components of computer 401 may include, but are not limited to, one or more processors or processing units 405, a system memory 410, a storage system 420, network interface 430, and a bus 450 that couples various system components including the system memory 410 and storage system 420 to processors 405 along with the network interface 430 and various input/output components. In other embodiments, arrangement 400 is distributed and includes a plurality of discrete computing devices that are connected through wired or wireless networking.

Bus 450 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 401 typically includes a variety of computer system readable media. Such media may be any available media that is accessible by computer 401, and it includes both volatile and non-volatile media, removable and non-removable media.

System memory 410 can include computer system readable media in the form of volatile memory, such as random access memory (RAM) and/or cache memory. Computer 401 may further include other removable/non-removable, volatile/non-volatile computer system storage media. In some examples storage system 420 may be included as part of memory 410 and may typically provide a non-volatile memory for the networked computing devices, and may include one or more different storage elements such as Flash memory, a hard disk drive, a solid state drive, an optical storage device, and/or a magnetic storage device. For example, storage system 420 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 550 by one or more data media interfaces. Storage 420 may include media for storing endpoint correlation data 421 (e.g., endpoint correlation table 200). The storage system 420 may also include network assessment data 422, assessment parameters 423 and other data related to the running of programming modules 415. The information stored in storage system 420 may be updated and accessed by the program modules 415 described herein.

Memory 410 may include a plurality of program modules 415 for performing various functions related to network performance assessment described herein. The modules 415 generally include program code that is executable by one or more of the processors 405. As shown, modules 415 include network interaction module 411, endpoint module 412, and assessment module 413.

The modules 415 may also interact with each other and storage system 420 to perform certain functions. For example, the network interaction module 411 may be configured to determine a plurality or a set of first endpoints. In some examples, the network interaction module 411 may act as a controller for multiple agent components configured to inject network probe traffic. In some examples, the multiple agents may be embodied as and/or executed by endpoint module 412. For example, as shown in FIG. 1, network interaction module 411 may determine or identify endpoints 110-117 as relevant sources or sinks of the network probe traffic. The network interaction module 411 may also in conjunction with endpoint module 412 collect initial measurements relating to the transmission of probe traffic between endpoints of endpoint pairs in a plurality of endpoint pairs and store the collected data in endpoint correlation data 421. For example, as shown in FIG. 1, network interaction module 411 transmits, in conjunction with endpoint module 412, probe traffic between each of the endpoint pairs (e.g., endpoint 110-endpoint 111, endpoint 110-endpoint 112, . . . etc.). In some examples, the endpoints in the plurality of endpoint pairs may be selected from a plurality of endpoints in a network. For example, the network interaction module 411 may determine the set or plurality of endpoints such as endpoints 110-117 in the network 102 from a larger set of endpoints. In some examples, the endpoints may comprise points at which an application or service is deployed or will be deployed.

Furthermore, in one example, the network interaction module 411 may be configured to further transmit probe traffic between two endpoints of each endpoint pair, measure throughput of the probe traffic, and store the throughput value for each endpoint pair in an endpoint correlation table. For example, network interaction module 411 may transmit probe traffic between each of the endpoints 110-117 as shown in FIG. 1, measure the throughput and store the throughput in table 200. In some examples, network interaction module 411 in conjunction with endpoint module 412 transmits network probe traffic using a ring traffic pattern described above. In the examples described the network probe traffic is sent and measured simultaneously or concurrently. Fast and multiple concurrent measurements efficiently enable quick coverage and collection of data for endpoint pairs. Furthermore, multiple concurrent measurements may reveal aspects of performance that may be missed if only single measurements are taken at a time. Furthermore, in one example, the probe traffic may be configured to measure throughput between endpoints in the network. For example, the probe traffic may measure the throughput from endpoint 110 to endpoint 114, etc. as shown in FIG. 1. In another example, the probe traffic may be configured to measure other network properties such as packet delay, packet jitter, and/or packet loss among other network metrics.

In yet another example embodiment, the network interaction module 411, with endpoint module 412, may be configured to also transmit probe traffic between two endpoints of each endpoint group pair, and measure one or more traffic pattern or performance assessment parameters between each measurement endpoint of each endpoint group. As described above, this probe traffic may also be sent in a ring traffic pattern using multiple simultaneous and concurrent probe traffic injections to measure between the multiple measurement endpoints of the endpoint groups. For example, as shown in FIG. 3, the network interaction module 411 may transmit probe traffic between each of the endpoint groups 150, 152, 154, and 156 using the selected endpoints 110, 112, 114, and 117. In some embodiments, the probe traffic may also be configured to measure network properties such as network throughput, packet delay, packet loss, and network jitter. In some examples, the network interaction module 411 may use a workload package as the probe traffic. For example, a standard packet sent as part of an application service may be used as the probe traffic. The network interaction module 411 may also be configured to measure a performance parameter of an application running on the network. For example, the network interaction module 411 may measure the QoS of a distributed application on the network 102. In one embodiment, if the measured performance parameter of the application is below a performance parameter threshold stored in assessment parameters 423, network interaction module 411 may determine, from the network performance assessment an endpoint group which provides an improved performance of the application and orchestrating a deployment of the application to utilize an endpoint of the determined endpoint group. For example, if an application is utilizing endpoint 117 and endpoint 113 in the network 102 and the QoS of the distributed application is not optimal, the application components may be redistributed or redeployed to utilize other endpoints, such as endpoint 117 and endpoint 110 which, according to the network assessment, provide the QoS for the distributed application. Based on the assessment, users may select endpoints in one of the endpoint groups to deploy an application since the endpoints within a group are likely to be topologically close resulting in optimized end-to-end performance. The network performance assessment may also be used to determine other network properties such as estimating a bi-section bandwidth of the network. Representative endpoints from each group may be used for efficient performance monitoring by avoiding probing of paths within endpoint groups.

The modules of 415 may also include endpoint module 412. In addition to the endpoint module 412 roles as an agent component in conjunction with the network interaction module 411, endpoint module 412 may also cluster the plurality of endpoints into a plurality of endpoint groups, based on the collected initial measurements stored in endpoint correlation data 421. The endpoint groups may be stored as network assessment 422. In one example, endpoint module 412 may determine from the endpoint correlation table 200 stored as endpoint correlation data 421, a plurality of endpoints with similar rows of data in the correlation matrix. Thresholds for similarity may be defined to cluster endpoints into groups. For example, the endpoints 110 and 111 are clustered into endpoint group 150.

In one embodiment, endpoint module 412 may also determine a plurality of endpoint group pairs, based on the plurality of endpoint groups. In one embodiment, endpoint module 412 may select a representative endpoint from each plurality of endpoint groups to be used for injecting probe traffic and pair the representative endpoint with each other representative endpoint from the plurality of endpoint groups. For example, endpoint module 412 may pair endpoint 116 to endpoints 114, 112, and 110 as shown in FIG. 3. The endpoint module 412 may repeat this process for each endpoint group 150, 152, and 154. In some examples, selection of the endpoints in the endpoint groups may be random. In another example, selection of the endpoint pairs may proceed in a round-robin selection between the endpoints. In one example, after one or more endpoints are identified and measured, other endpoints may be substituted in and measured during subsequent measurements. If a given network performance tests requires only one flow between an endpoint group, one endpoint per group could be used. Similarly, if two flows are required between an endpoint group, two endpoints could be used.

The modules 415 may also include assessment module 413. In one example, assessment module may generate a network performance assessment, based on monitoring traffic flows between endpoints within the endpoint groups in the plurality of endpoint group pairs. This network performance assessment will provide a user information about the performance of the network and provide expected performance of network traffic as the traffic traverses the network.

In one embodiment, the assessment module 413 may also determine that the generated network performance assessment is stale or that particular endpoint grouping is stale and reprocess and/or update the network performance assessment. For example, assessment module 413 may determine that a period of time has passed since a previous network assessment and reprocess the network performance assessment. In another example, if a grouping of endpoints begins to exhibit different or non-similar network performance, the network performance assessment may be considered stale.

Computer 401 may also communicate with one or more external devices such as a keyboard, a pointing device, a display, etc.; and one or more devices that enable a user to such as interact with computer 401; and/or any devices (e.g., network card, modem, etc.) that enable computer 401 to communicate with one or more other computing devices. Such communication can occur via an I/O interface. Additionally, computer 401 may communicate with one or more networks such as a local area network (LAN), a general wide area network (WAN), and/or a public network (e.g., the Internet) via network interface 430. As depicted, network interface 430 communicates with the other components of computer 401 via bus 450. It should be understood that although not shown, other hardware and/or software components could be used in conjunction with computer 401. Examples, include, but are not limited to: cloud computing systems, microcode, device drivers, redundant processing units, external disk drive arrays, RAID systems, tape drives, and data archival storage systems, etc.

Figure 5:
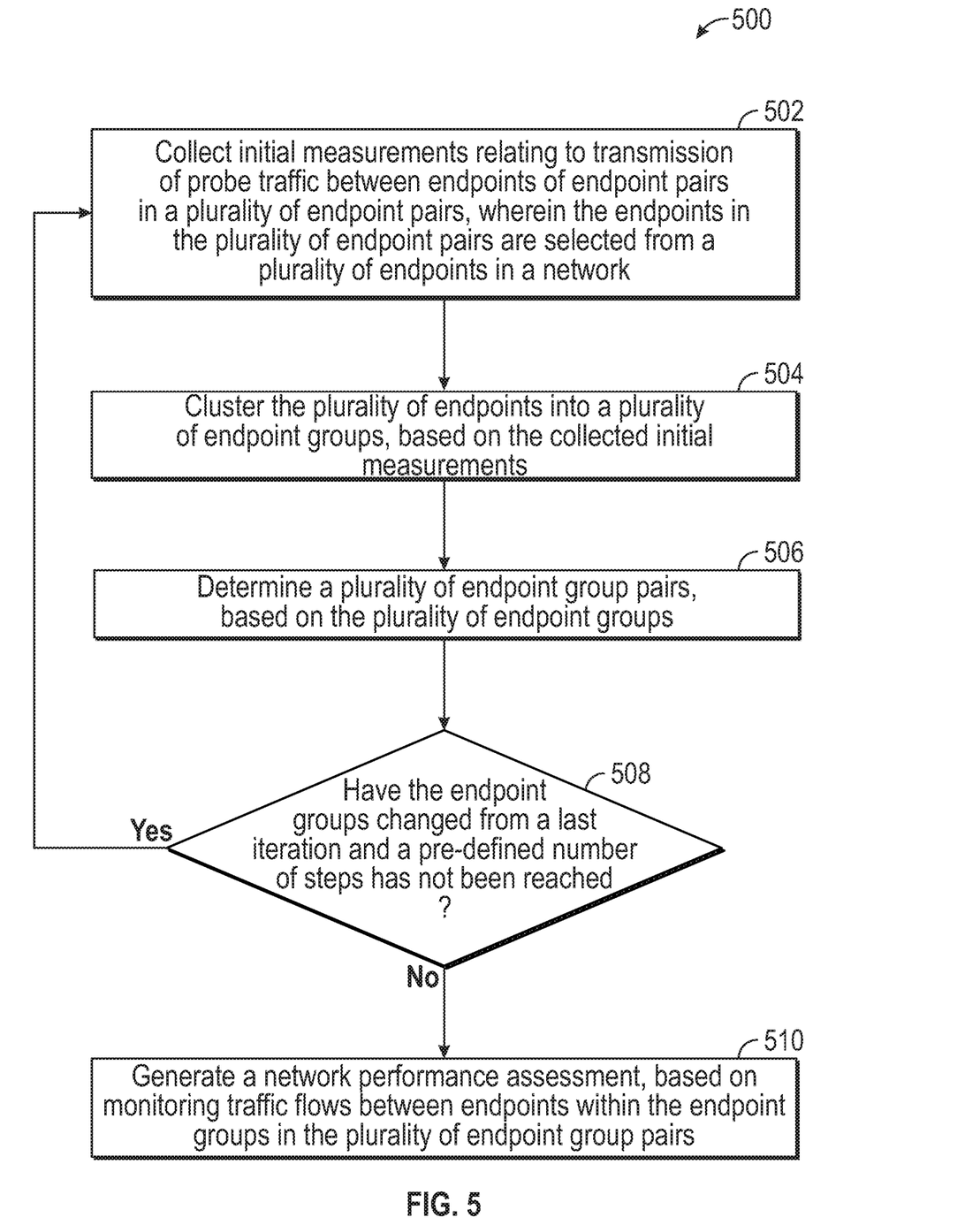
FIG. 5 illustrates a method to generate a network performance assessment, according to one embodiment.

FIG. 5 illustrates a method to generate a network performance assessment, according to one embodiment. Method 500 begins at block 502 where a computer, such as computer 401, collects initial measurements relating to transmission of probe traffic between endpoints of endpoint pairs in a plurality of endpoint pairs, wherein the endpoints in the plurality of endpoint pairs are selected from a plurality of endpoints in a network. Method 500 continues at block 504, where a computer, such as computer 401, clusters the plurality of endpoints into a plurality of endpoint groups, based on the collected initial measurements. At block 506, the method 500 continues where a computer, such as computer 401, determines a plurality of endpoint group pairs, based on the plurality of endpoint groups. Method 500 continues at block 508, and evaluates whether the endpoint groups have changed from the last iteration and a predefined number of steps have not been reached. If yes, the method return to block 502. Otherwise the method continues to block 510, where a computer, such as computer 401, generates a network performance assessment, based on performance metrics pertaining to probe traffic injected between endpoints across the endpoint groups in the plurality of endpoint group pairs.

Figure 6:
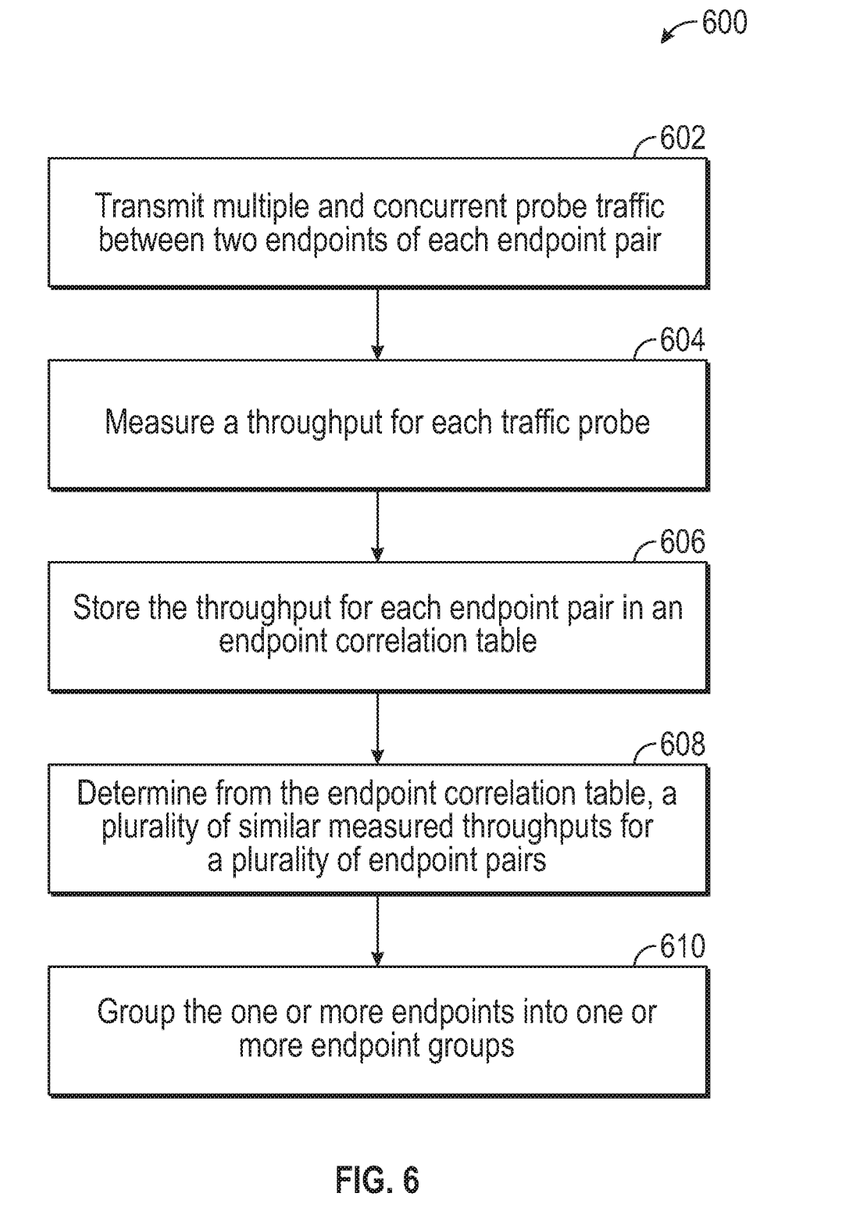
FIGS. 6 and 7 illustrate additional methods to generate a network performance assessment, according to one embodiment.

FIG. 6 illustrates an additional method to generate a network performance assessment, according to one embodiment. Method 600 begins at block 602 where a computer, such as computer 401, transmits probe traffic between two endpoints of each endpoint pair. In some examples, the probe traffic may be transmitted in a ring traffic pattern and transmitted in several iterations to capture multiple measurements. The probe traffic may also comprise multiple concurrent injections of the probe traffic in the network at the multiple endpoints. Method 600 then continues at blocks 604 and 606, where a computer, such as computer 401, measures a throughput of the probe traffic and stores the throughput for each endpoint pair in an endpoint correlation table. In some examples, if multiple measurements are taken, the collected measurements are summarized (e.g., the collected measurements are averaged together, a median value of the collected measurements is selected, and/or a random representative value is selected) and the summary is stored in the endpoint table. In one embodiment, method 600 continues at block 608, where a computer, such as computer 401, determines from the endpoint correlation table, a plurality of similar measured throughputs/throughput values for a plurality of endpoint pairs, wherein the one or more throughputs are similar if a difference between the one or more throughputs is within a similarity threshold. Method 600 then continues at block 610 where a computer, such as computer 401, based on the one or more similar throughputs, groups the one or more endpoints into one or more endpoint groups.

Figure 7:
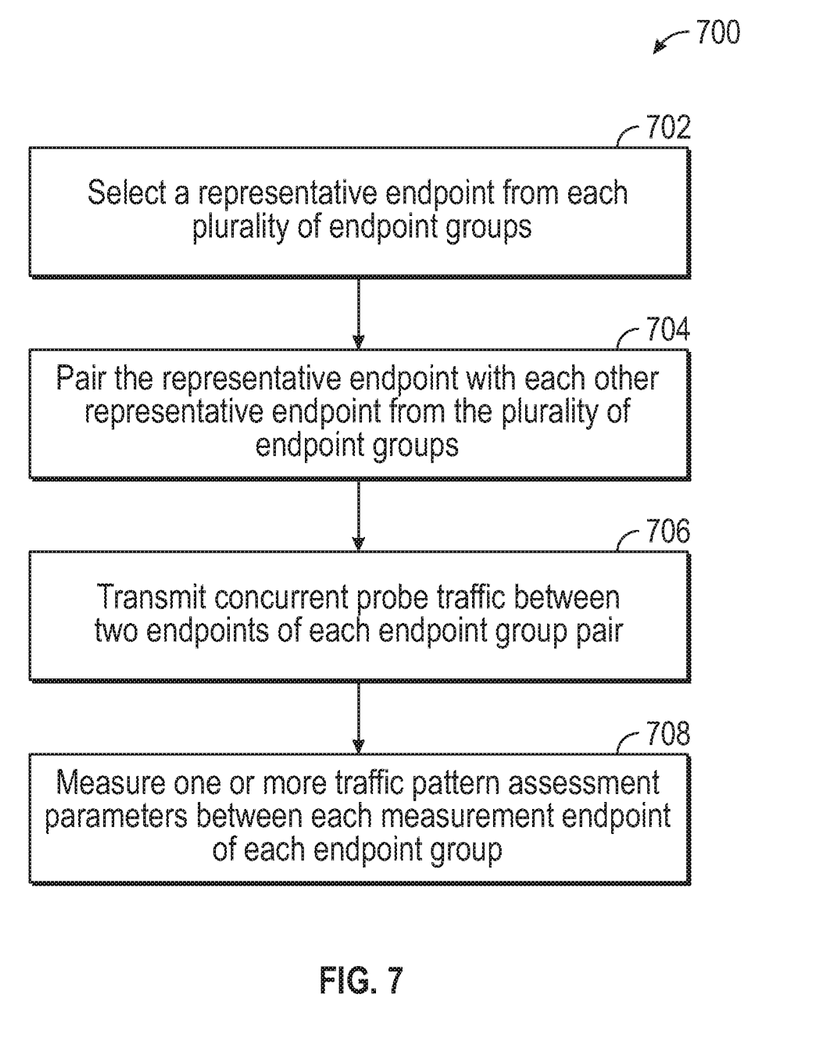

FIG. 7 illustrates an additional method to generate a network performance assessment, according to one embodiment. Method 700 begins at block 702 where a computer, such as computer 401, selects a representative endpoint from each plurality of endpoint groups. Method 700 then continues at block 704, where a computer, such as computer 401, pairs the representative endpoint with each other representative endpoint from the plurality of endpoint groups. In one embodiment, method 700 continues at blocks 706 and 708, where a computer, such as computer 401, transmits probe traffic between two endpoints of each endpoint group pair and measures one or more traffic pattern or performance assessment parameters between each measurement endpoint of each endpoint group. In some examples, the probe traffic may be transmitted in a ring traffic pattern and transmitted in several iterations to capture multiple measurements. The probe traffic may also comprise multiple concurrent injections of the probe traffic in the network at the multiple endpoints. The traffic pattern or performance assessment parameters may comprise a network throughput, packet delay, packet loss, and/or network jitter. In one example, the probe traffic may comprise a workload package.

Figure 8:
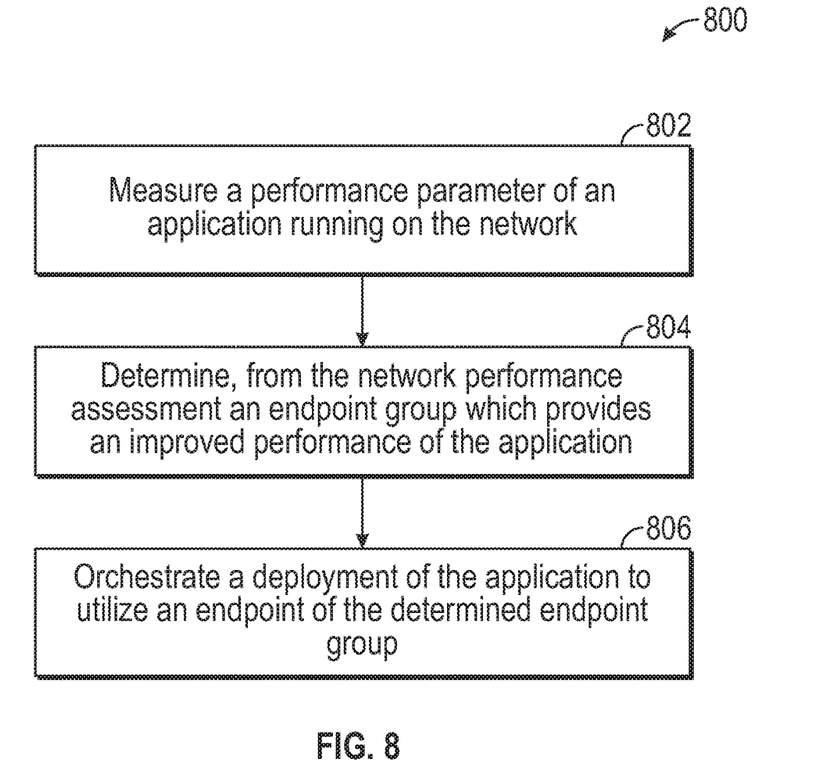
FIG. 8 illustrates a method to utilize a network performance assessment, according to one embodiment.

FIG. 8 illustrates a method to utilize a network performance assessment, according to one embodiment. Method 800 begins at block 802 where a computer, such as computer 401, measures a performance parameter of an application running on the network. In one embodiment, if the measured performance parameter of the application is below a performance parameter threshold, method 800 then continues at block 804, where a computer, such as computer 401, determines, from the network performance assessment an endpoint group which provides an improved performance of the application. At block 806, method 800 continues where a computer, such as computer 401, orchestrates a deployment of the application to utilize an endpoint of the determined endpoint group.

Figure 9:
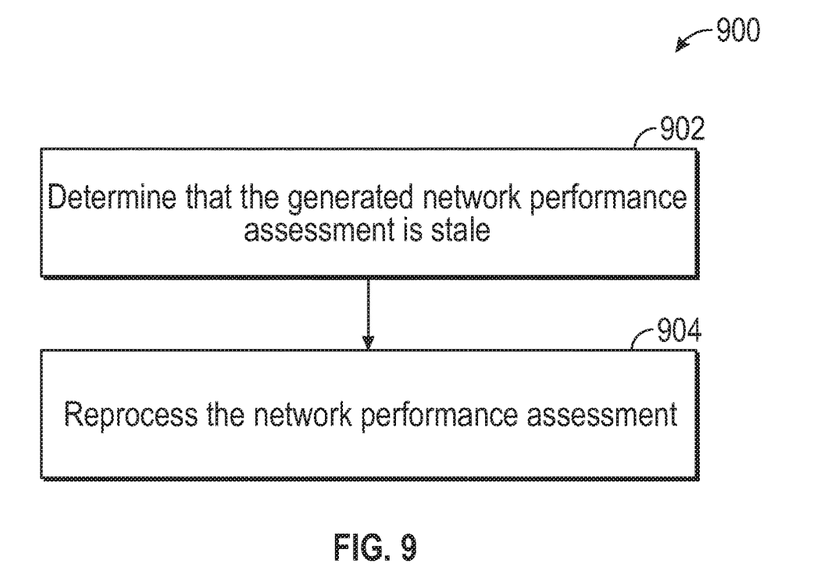
FIG. 9 illustrates an additional method to generate a network performance assessment, according to one embodiment.

FIG. 9 illustrates an additional method to generate a network performance assessment, according to one embodiment. Method 900 begins at block 902 where a computer, such as computer 401, determines that the generated network performance assessment is stale. For example, an endpoint grouping in the network performance assessment may be stale (e.g., a grouping of endpoints begins to exhibit different or non-similar network performance and/or a period of time has passed since a previous network assessment). At block 904, method 900 continues where a computer, such as computer 401, reprocesses and/or updates the network performance assessment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications such as modules 415 or related data available in the cloud. For example, the modules could execute on a computing system in the cloud and perform the functions for network assessment described herein. In such a case, the modules 415 could generate a network performance assessment and store the network assessment and related measurements at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method for network performance assessment comprising:
    collecting initial measurements relating to transmission of probe traffic between a plurality of endpoints in a network, wherein the probe traffic is transmitted between endpoints in endpoint pairs selected from the plurality of endpoints;
    clustering the plurality of endpoints into a plurality of endpoint groups, based on the collected initial measurements;

determining a plurality of endpoint group pairs, based on the plurality of endpoint groups; and generating a network performance assessment, based on measuring performance metrics pertaining to traffic between endpoints across the endpoint groups in the plurality of endpoint group pairs and the initial measurements.

2. The method of claim 1, wherein collecting the initial measurements relating to the transmission of probe traffic further comprises:

transmitting probe traffic between two endpoints of each endpoint pair;

measuring a throughput value of the probe traffic; and storing the throughput value for each endpoint pair in an endpoint correlation table.

3. The method of claim 2, wherein clustering the plurality of endpoints into a plurality of endpoint groups, based on the collected initial measurements further comprises:

determining from the endpoint correlation table, a plurality of similar measured throughput values for a plurality of endpoint pairs, wherein the throughput values of the plurality of endpoints pairs are similar if a difference between the one or more throughput values is within a similarity threshold; and based on the one or more similar throughputs, grouping the one or more endpoints into one or more endpoint groups.

4. The method of claim 1, wherein determining a plurality of endpoint group pairs, based on the plurality of endpoint groups further comprises:

selecting a representative endpoint from each plurality of endpoint groups; and pairing the representative endpoint with each other representative endpoint from the plurality of endpoint groups.

5. The method of claim 4, wherein generating a network performance assessment further comprises:

transmitting probe traffic between two endpoints of each endpoint group pair; and measuring one or more performance assessment parameters between each measurement endpoint of each endpoint group.

6. The method of claim 5, wherein performance assessment parameters comprise one or more of:

network throughput;

packet delay;

packet loss; and network jitter.

7. The method of claim 5, wherein the probe traffic comprises a workload package.

8. The method of claim 1, further comprising:

measuring a performance parameter of an application running on the network;

if the measured performance parameter of the application is below a performance parameter threshold, determining, from the network performance assessment an endpoint group which provides an improved performance of the application; and orchestrating a deployment of the application to utilize an endpoint of the determined endpoint group.

9. The method of claim 1, further comprising:

determining that the generated network performance assessment is stale; and reprocessing the network performance assessment.

10. A system for performing network performance assessment, comprising:

one or more computer processors; and a memory containing a program which when executed by the one or more computer processors performs an operation comprising:

collecting initial measurements relating to transmission of probe traffic between a plurality of endpoints in a network, wherein the probe traffic is transmitted between endpoints in endpoint pairs selected from the plurality of endpoints;

clustering the plurality of endpoints into a plurality of endpoint groups, based on the collected initial measurements;

determining a plurality of endpoint group pairs, based on the plurality of endpoint groups; and generating a network performance assessment, based on measuring performance metrics pertaining to traffic between endpoints across the endpoint groups in the plurality of endpoint group pairs and the initial measurements.

11. The system of claim 10, wherein to collect the initial measurements relating to the transmission of probe traffic further, the operation further comprises:

transmitting probe traffic between two endpoints of each endpoint pair;

measuring a throughput value of the probe traffic; and storing the throughput value for each endpoint pair in an endpoint correlation table.

12. The system of claim 11, wherein to cluster the plurality of endpoints into a plurality of endpoint groups, based on the collected initial measurements, the operation further comprises:

determining from the endpoint correlation table, a plurality of similar measured throughput values for a plurality of endpoint pairs, wherein the throughput values of the plurality of endpoints pairs are similar if a difference between the one or more throughput values is within a similarity threshold; and based on the one or more similar throughputs, grouping the one or more endpoints into one or more endpoint groups.

13. The system of claim 10, wherein to determine a plurality of endpoint group pairs, based on the plurality of endpoint groups, the operation further comprises:

selecting a representative endpoint from each plurality of endpoint groups; and pairing the representative endpoint with each other representative endpoint from the plurality of endpoint groups.

14. The system of claim 13, wherein to generate a network performance assessment, the operation further comprises:

transmitting probe traffic between two endpoints of each endpoint group pair; and measuring one or more performance assessment parameters between each measurement endpoint of each endpoint group.

15. The system of claim 10, wherein the operation further comprises:

measuring a performance parameter of an application running on the network;

if the measured performance parameter of the application is below a performance parameter threshold, determining, from the network performance assessment an endpoint group which provides an improved performance of the application; and orchestrating a deployment of the application to utilize an endpoint of the determined endpoint group.

16. A non-transitory computer program product for network performance assessment, the computer program product comprising:

a computer-readable storage medium having computer-readable program code embodied therewith, the computer-readable program code executable by one or more computer processors to perform an operation that includes:

collecting initial measurements relating to transmission of probe traffic between a plurality of endpoints in a network, wherein the probe traffic is transmitted between endpoints in endpoint pairs selected from the plurality of endpoints;

clustering the plurality of endpoints into a plurality of endpoint groups, based on the collected initial measurements;

determining a plurality of endpoint group pairs, based on the plurality of endpoint groups; and generating a network performance assessment, based on measuring performance metrics pertaining to traffic between endpoints across the endpoint groups in the plurality of endpoint group pairs and the initial measurements.

17. The computer program product of claim 16, wherein, wherein to collect the initial measurements relating to the transmission of probe traffic, the operation further comprises:

transmitting probe traffic between two endpoints of each endpoint pair;

measuring a throughput value of the probe traffic; and storing the throughput value for each endpoint pair in an endpoint correlation table; and wherein to cluster the plurality of endpoints into a plurality of endpoint groups, based on the collected initial measurements, the operation further comprises:

determining from the endpoint correlation table, a plurality of similar measured throughput values for a plurality of endpoint pairs, wherein the throughput values of the plurality of endpoints pairs are similar if a difference between the one or more throughput values is within a similarity threshold; and based on the one or more similar throughputs, grouping the one or more endpoints into one or more endpoint groups.

18. The computer program product of claim 16, wherein to determine a plurality of endpoint group pairs, based on the plurality of endpoint groups, the operation further comprises:

selecting a representative endpoint from each plurality of endpoint groups; and pairing the representative endpoint with each other representative endpoint from the plurality of endpoint groups; and wherein to generate a network performance assessment, the operation further comprises:

transmitting probe traffic between two endpoints of each endpoint group pair; and measuring one or more performance assessment parameters between each measurement endpoint of each endpoint group.

19. The computer program product of claim 16, wherein the operation further comprises:

measuring a performance parameter of an application running on the network;

if the measured performance parameter of the application is below a performance parameter threshold, determining, from the network performance assessment an endpoint group which provides an improved performance of the application; and orchestrating a deployment of the application to utilize an endpoint of the determined endpoint group.

20. The computer program product of claim 16, wherein the operation further comprises:

determining that the generated network performance assessment is stale; and reprocessing the network performance assessment.

* * * * *